United States Patent
Ahmad et al.

(10) Patent No.: US 11,933,600 B2
(45) Date of Patent: Mar. 19, 2024

(54) HIGH RESOLUTION DISTRIBUTED SENSOR UTILIZING OFFSET CORE OPTICAL FIBER

(71) Applicant: OFS FITEL, LLC, Norcross, GA (US)

(72) Inventors: Raja A Ahmad, South Bound Brook, NJ (US); Kenneth S Feder, Murray Hill, NJ (US); Wing Ko, Helmetta, NJ (US); Paul S Westbrook, Bridgewater, NJ (US)

(73) Assignee: OFS FITEL, LLC, Norcross, GA (US)

(*) Notice: Subject to any disclaimer, the term of this patent is extended or adjusted under 35 U.S.C. 154(b) by 295 days.

(21) Appl. No.: 17/288,971

(22) PCT Filed: Nov. 18, 2019

(86) PCT No.: PCT/US2019/061942
§ 371 (c)(1),
(2) Date: Apr. 27, 2021

(87) PCT Pub. No.: WO2020/117457
PCT Pub. Date: Jun. 11, 2020

(65) Prior Publication Data
US 2021/0389121 A1 Dec. 16, 2021

Related U.S. Application Data

(60) Provisional application No. 62/775,123, filed on Dec. 4, 2018.

(51) Int. Cl.
 *G01B 11/16* (2006.01)
 *G01B 11/24* (2006.01)
(52) U.S. Cl.
 CPC ........ *G01B 11/161* (2013.01); *G01B 11/2441* (2013.01)

(58) Field of Classification Search
 CPC ... G01B 11/161; G01B 11/2441; G01B 11/18; G01D 5/35316; G01D 5/35377; G01D 5/3538; G01L 1/243; G01L 1/246
 See application file for complete search history.

(56) References Cited

U.S. PATENT DOCUMENTS

| | | |
|---|---|---|
| 4,930,862 A | 6/1990 | Miers et al. |
| 5,604,318 A | 2/1997 | Fasshauer |

(Continued)

FOREIGN PATENT DOCUMENTS

| | | |
|---|---|---|
| JP | 2002048898 | 2/2002 |
| WO | WO2011034584 | 3/2011 |

(Continued)

OTHER PUBLICATIONS

Ahmad, Raja, et al., "Characterization of small-scale contortions on a physical-surface using a distributed optical-fiber sensor", Conference on Lasers and Electro-Optics, May 10, 2019, pp. 1-2.

(Continued)

*Primary Examiner* — Tony Ko
(74) *Attorney, Agent, or Firm* — Law Office of Wendy W. Koba, Esq.

(57) ABSTRACT

An extended length of optical fiber having an offset core with an inscribed Bragg grating is used a distributed sensor in combination with an optical frequency domain reflectometer (OFDR) to enable measurement small-scale (e.g., sub-millimeter) contortions and forces as applied to the fiber. The offset core may be disposed in a spiral configuration around the central axis of the optical fiber to improve the spatial resolution of the measurement. A reference surface exhibit a predetermined texture (in the form of a series of corrugations, for example, that may be periodic or aperiodic, as long as known a priori) is disposed adjacent to a longitudinal portion of the sensor fiber. The application of a force to the combination of the plate and the fiber creates a (Continued)

local strain in the grating formed along the offset core of the fiber that results in a shift in the Bragg wavelength of the grating. Using ODFR measurement techniques, an analysis of the Bragg wavelength shift allows for a high resolution force measurement to be obtained.

20 Claims, 8 Drawing Sheets

(56) References Cited

U.S. PATENT DOCUMENTS

| | | | |
|---|---|---|---|
| 8,616,069 | B2 | 12/2013 | Du et al. |
| 9,553,664 | B2 | 1/2017 | Horikx et al. |
| 10,132,614 | B2 * | 11/2018 | Froggatt .............. G01B 9/0209 |
| 2016/0047976 | A1 | 2/2016 | Schade et al. |

FOREIGN PATENT DOCUMENTS

| | | |
|---|---|---|
| WO | WO 2013/136247 | 9/2013 |
| WO | WO 2018075911 | 4/2018 |

OTHER PUBLICATIONS

Ahmad, Raja, et al., "Probing micron-scale distributed contortions via a twisted multicore optical fiber", APL Photonics, American Institute of Physics, 2 Huntington Quadrangle, Melville, NY, 11747, vol. 4, No. 6, Jun. 4, 2019, pp. 1-7.

Wanser, Keith, et al., "Novel Fiber Devices and Sensors Based on Multimode Fiber Bragg Gratings", Proceedings of SPIE, vol. 2360, 1994, pp. 265-268.

Donlagic, Denis, et al., "Microbend Sensor Structure for Use in Distributed and Quasi-Distributed Sensor Systems Based on Selective Launching and Filtering of the Modes in Graded Index Multimode Fiber", Journal of Lightwave Technology, IEEE, vol. 17, No. 10, Oct. 1999, pp. 1856-1868.

Westbrook, P.S., et al., "Distributed Sensing Over Meter Lengths Using Twisted Multicore Optical Fiber With Continuous Bragg Gratings", Retrieved from the Internet: URL:https://www.furukawa.co.jp/en/rd/review/fr48_08.pdf, Retrieved on Oct. 26, 2022, Furukawa Electric Review, No. 48, 2017, pp. 26-32.

\* cited by examiner

HIGH RESOLUTION DISTRIBUTED SENSOR UTILIZING OFFSET CORE OPTICAL FIBER

CROSS-REFERENCE TO RELATED APPLICATIONS

This application claims the benefit of U.S. Provisional Application No. 62/775,123, filed Dec. 4, 2018 and hereby incorporated by reference.

TECHNICAL FIELD

The present invention relates to the use of an extended length of optical fiber as a distributed sensor and, more particularly, to the use of an offset core optical fiber with inscribed gratings to perform optical frequency domain reflectometry (OFDR) measurements of small-scale (sub-millimeter) contortions and applied forces.

BACKGROUND OF THE INVENTION

Besides their use as a communication signal path, optical fibers are also used in sensing applications, where changes in ambient conditions modify the properties of the fiber such that a propagating optical signal undergoes changes that can be measured and then correlated to the specific ambient change (e.g., changes in temperature, strain, applied forces, contortions, and the like). Advantageously, an extended length of optical fiber can be used as a distributed sensor, detecting one or more selected measurands along its entire length, which may be up to tens of kilometers.

When discrete or continuous Bragg gratings are inscribed along such an optical fiber sensor, the performance of the sensor can be greatly improved, and the methods of obtaining and using measured changes along the fiber can be simplified. Many distributed fiber sensor applications involve long lengths of optical fiber that are used to monitor the structural integrity of buildings, bridge spans, and the like. Downhole sensing for oil/gas wells, security monitoring (including detecting the presence of unwanted gases or liquids in the environment) are examples of other useful applications.

In most of these cases, the Bragg gratings are inscribed within a core region disposed along the central axis of the fiber. Other fiber configurations utilize an offset core, or even a set of offset cores (also referred to as a multi-core offset fiber) to detect and measure bends at various points along the fiber. A fiber sensor formed to include an offset core is thus able to measure off-axis strain (positive or negative—depending on the direction of the bend) produced along the fiber. Therefore, a fiber with a light-guiding core that is offset from the central axis can be used to detect bends and contortions (i.e., twists) along the fiber by performing localized strain measurements of the shift in Bragg grating wavelength in the offset core.

Moreover, a triplet of such cores located symmetrically around the central axis (i.e., a multi-core offset fiber) can be used to obtain complete, three-dimensional information about the curvature and torsion imposed on objects-under-study.

While past work has examined bending and other contortions in the range of centimeter to meter lengths, the available sensor fibers lack the ability to recognize and measure sub-millimeter changes in contortion or applied force.

SUMMARY OF THE INVENTION

The needs remaining in the prior art are addressed by the present invention, which relates to the use of an extended length of optical fiber as a distributed sensor and, more particularly, to the use of an offset core optical fiber with inscribed gratings to perform optical frequency domain reflectometry (OFDR) measurements of small-scale (e.g., sub-millimeter) contortions and applied forces.

In one or more exemplary embodiments, a contortion-sensing optical fiber includes an offset core disposed in a spiral configuration around the central axis of the optical fiber (also referred to at times as a "twisted" configuration) to be used as a sensor fiber. An OFDR including a "tunable laser source" (TLS) is used in combination with a spatial Fourier analyzer to obtain information about bends and displacements along the length of the optical fiber.

Various embodiments of the present invention may utilize multiple offset cores, each exhibiting the same spiral period, but spaced from one another. For example, a set of three offset cores may all be positioned at the same radial displacement from the center of the sensor fiber, with a uniform spatial separation of 120° between each core, thus enabling the measurement of sub-mm distortions in all directions. Yet other embodiments may utilize a single offset core that is disposed along a single azimuthal line along the length of the sensor fiber (i.e., not formed as a spiral around the central axis of the sensor fiber). Such an embodiment may be used as long as the offset core is not positioned in a plane that is perpendicular to the plane of an applied force. Multiple, non-spiraled offset sources may also be used.

While the sensor fiber may be formed of a conventional glass material, other embodiments may utilize a sensor fiber formed of a material that is less elastic, with a smaller Young's modulus that allows for an even finer degree of measurement resolution.

Embodiments may utilize a reference device having a defined surface topology (i.e., defined contortion pattern) that is used in combination with the sensor fiber to provide contortion measurements.

An exemplary embodiment of the present invention takes the form a distributed force sensing system comprising a contortion-sensing optical fiber and associated OFDR system. The contortion-sensing optical fiber is formed to have at least one offset core region and including a continuous fiber Bragg grating (FBG) inscribed along the at least one offset core region, the continuous FBG formed to exhibit a defined Bragg wavelength $\lambda_{Bragg}$. The OFDR system includes a tunable wavelength laser source for generating a wavelength-swept optical monitoring beam with a wavelength range including the defined Bragg wavelength $\lambda_{Bragg}$, wherein a first portion of the wavelength-swept optical monitoring beam is applied as an input to the at least one offset core region of the contortion-sensing optical fiber, creating a reflected optical beam at the defined Bragg wavelength $\lambda_{Bragg}$. The OFDR also includes an optical detector responsive to a second, remaining portion of the wavelength-swept optical monitoring beam and the reflected beam from the contortion-sensing optical fiber to create an optical output signal of a combination of both inputs, and a Fourier analyzer coupled to the optical detector and utilized to perform a Fourier transform on the optical detector output signal to generate a measurement of a local Bragg wavelength, wherein a defined shift in wavelength between the defined Bragg wavelength and the local Bragg wavelength corresponds to the application of a force to the contortion-sensing optical fiber.

Other and further embodiments and features of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

The ability to provide high resolution and accurate detection of micron-scale deformations that are distributed over a surface, or appear as bends along an arbitrary three-dimensional path (and hereinafter referred to as "contortions") is useful in a variety of applications. An exemplary contortion-sensing device should exhibit exemplar properties in terms of spatial resolution, sensitivity, and accuracy, while also able to provide distributed contortion measurements over an extended distance. As will be described in detail below, the present invention relates to an optical fiber-based distributed contortion sensor that utilizes an offset-core optical fiber in combination with an optical frequency domain reflectometry system and associated Fourier analysis to carry out distributed measurements of sub-millimeter scale micro-contortions and applied forces on an object under study.

The offset-core optical fiber is formed to include a continuous fiber Bragg grating inscribed along the core (the fiber may comprise a plurality of offset cores, as discussed below, to improve spatial resolution of sensed contortions). The application of optical frequency domain reflectometry (OFDR), accompanied by a spatial Fourier analysis, on a wavelength-swept light beam propagating (and reflecting) along the fiber, reveals information regarding the presence of any contortions experienced by the fiber (with at least a sub-mm resolution, and preferably a sub-micron resolution). The ability to achieve the sub-micron level may involve factors such as using a reference surface in combination with the contortion-sensing optical fiber, modifying the material system of the fiber, increasing the number of offset cores formed in the fiber, etc. With this high-level understanding of the subject matter of the invention, the details will be now described.

Figure 1:
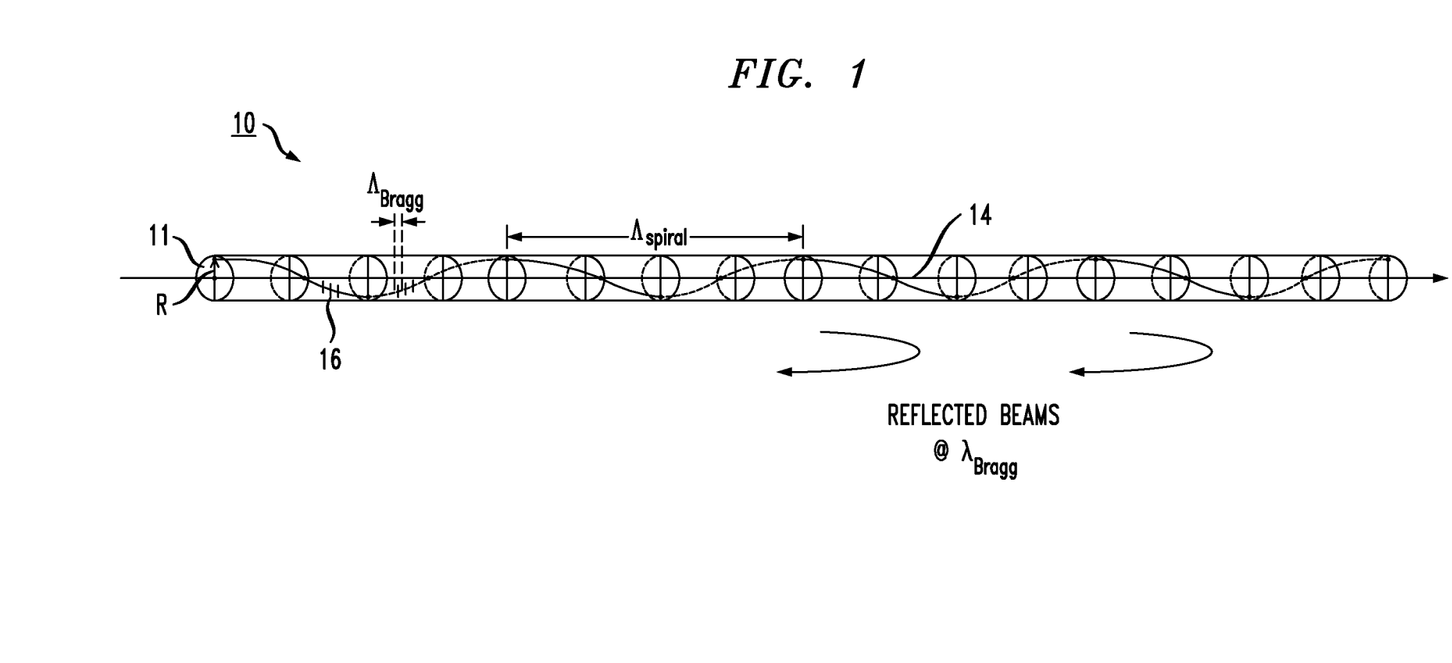
FIG. 1 illustrates an exemplary sensor fiber having an offset core in a spiral arrangement and including a continuous FBG inscribed along the length of the core.

FIG. 1 illustrates an exemplary contortion-sensing optical fiber 10 for use in a distributed contortion-sensing system formed in accordance with the principles of the present invention. In the particular embodiment illustrated in FIG. 1, contortion-sensing optical fiber 10 includes a single offset core 12 that is disposed in a spiral configuration along a central longitudinal axis 14 of fiber 10. Offset core 12 is shown as being displaced by a radius R from central axis 14, where the value of R remains constant as core 12 itself spirals along longitudinal axis 14. It is to be understood that the displacement radius R may be any value sufficient to allow for spatial changes in forces applied to contortion-sensing optical fiber 10 to create a measurable shift in the Bragg wavelength of the grating structure formed along the core. An acceptable range for R has found to be within 10-90% of the actual radius of the fiber. For example, in one exemplary embodiment where the outer diameter of a coated silica-based optical fiber is on the order of about 200 μm, core 12 may be offset from central axis 14 by an amount R=35 μm.

Offset core 12 is shown in this particular embodiment as being spiraled in a periodic form along the length of fiber 10, with the spiral shown here as having a fixed period $\Lambda_{spiral}$. For the purposes of discussion, $\Lambda_{spiral}$ may be on the order of several centimeters, with 2 cm being one exemplary value. In accordance with the sensing functionality of fiber 10, offset core 12 is inscribed with a weak, quasi-continuous Bragg grating 16 (referred to hereafter as fiber Bragg grating 16, or simply FBG 16), with the period $\Lambda_{Bragg}$ of the inscribed grating selected to define the wavelength ($\lambda_{Bragg}$)

that will be reflected by fiber 10, the reflected beam at $\lambda_{Bragg}$ exiting offset core 12 at the same endface (such as endface 11) as where the original light beam was introduced.

Inasmuch the application of an external force/contortion to fiber 10 imparts a stress-induced change in the refractive index of offset core 12 (including FBG 16), the associated Bragg wavelength will shift as a function of the magnitude of the applied force. The utilization of an OFDR system in combination with fiber 10 thus allows for the inventive sensor to recognize a change in the spectral beating (interference) between the reflected beam and a reference beam, and associate this change in spectral beating with the application of a force to fiber 10.

Figure 2:
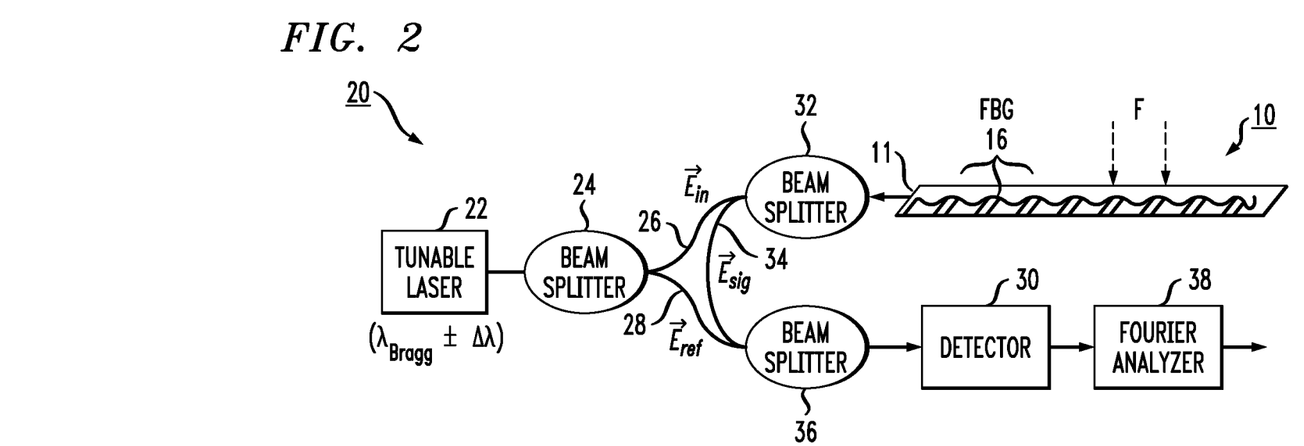
FIG. 2 depicts an exemplary embodiment of a distributed contortions system of the present invention that utilizes a fiber as shown in FIG. 1 in combination with an OFDR system to provide sub-mm resolution measurements of contortions and forces as experienced by the sensor fiber.

FIG. 2 illustrates these concepts, showing contortion-sensing optical fiber 10 as described above in combination with an optical frequency domain reflectometry (OFDR) system 20 to provide sub-mm scale measurements of micro-contortions/forces applied to fiber 10. In accordance with the principles of OFDR, a wavelength-swept input beam is directed into contortion-sensing optical fiber 10, with the reflected beam thereafter combined with a reference signal (here, a copy of the wavelength-swept input beam) to create an interference beam output which is thereafter used to recognize any change in the Bragg wavelength of fiber 10 by performing a frequency domain analysis of the combined beams. Therefore, any change in Bragg wavelength (which result from forces applied to fiber 10) will cause a change in the beat frequency pattern in the interference between the reflected and reference beams. The frequency domain analysis of the change in beat frequency pattern is then used to recognize (sense) the presence of this unwanted external force, as well as its magnitude. The details of the individual components of OFDR system 20, as well as its functioning to perform this frequency domain analysis will now be described.

Continuing with reference to FIG. 2, OFDR system 20 comprises a tunable laser source 22 that is configured as a swept wavelength (frequency) source, centered on the Bragg wavelength ($\lambda_{Bragg}$) of contortion-sensing optical fiber 10. In one exemplary embodiment, tunable laser source 22 may be configured to provide an output that is swept through a wavelength range ±10 nm on either side of $\lambda_{Bragg}$. For example, if $\lambda_{Bragg}$=1541 nm, tunable laser source may be configured to provide an output beam that scanned across the wavelength range of 1531 nm to 1551 nm.

The output beam from tunable laser 22 thereafter passes through a first beam splitter 24 of OFDR 20, which directs a majority of the beam (referred to at times as a "major beam") along a first signal path 26 and ultimately into contortion-sensing optical fiber 10. The remaining output beam from first beam splitter 24 (referred to at times as a "minor beam", or a "reference beam") is directed along a signal path 28 toward an optical detector 30 of OFDR system 20. By "majority" of the beam, it is intended that any fraction greater than 50% would be sufficient. However, preferred embodiments of the present invention utilize a larger fraction of the output signal (e.g., more than about 60%, preferably 80-95%), particularly if the distributed contortion sensing is being performed along a relatively long span of optical fiber.

The major beam propagating along signal path 26 is ultimately coupled into offset core 12 of sensor fiber 10 (this coupling occurs after the major beam passes through a beamsplitter discussed below). As mentioned above, the presence of FBG 16 along offset core 12 of contortion-sensing optical fiber 10 functions to reflect any light at its Bragg wavelength $\lambda_{Bragg}$, while allowing any light propagating at other wavelengths to continue to pass along unimpeded. Therefore, when the wavelength-swept beam from tunable laser source 22 reaches the Bragg wavelength value, the beam will be reflected back along core 12, and exit at endface 11. Since the output from tunable laser source 22 is configured to continuously scan along a wavelength range surrounding the Bragg wavelength in periodic fashion, the reflected beam will also be periodic in form, having a peak at each occurrence of the Bragg wavelength during the scan cycle.

As shown in FIG. 2, this reflected beam is directed into a second beam splitter 32 of OFDR 20, which is configured to direct the reflected beam along a signal path 34 and into a beam combiner 36. The reflected beam is joined with the reference ("minor") beam output from first beam splitter 24 in beam combiner 36, with the combination of the two beams (i.e., the resulting interference of the two beams) thereafter applied as an input to detector 30.

In accordance with the operating principles of optical frequency domain reflectometry, since the wavelength sweeping utilized by tunable laser source 22 is periodic in form, the periodic reference beam interferes with the (also periodic) reflected beam in a known manner. As long as no external force is applied to contortion-sensing fiber 10, $\lambda_{Bragg}$ will remain unchanged and the reflected beam (denoted at times hereafter as $\vec{E}_{sig}$) will also remain periodic, having a "noise floor" value with peaks in reflected power occurring at each instance of $\lambda_{Bragg}$ during the scan.

The reference beam (denoted at times hereafter as $\vec{E}_{ref}$) exhibits the same swept wavelength, periodic form as the output from tunable laser source 22. Therefore, the combination of $\vec{E}_{ref}$ and $\vec{E}_{sig}$ is recorded by optical detector 30 as a constant beat frequency pattern output. The output from optical detector 30 is thereafter applied as an input to Fourier analyzer 38, which performs frequency domain analysis, converting this frequency domain measurement into a space-domain measurement of phase and amplitude as a function of length along contortion-sensing fiber 10. In this specific case where there is no change in the frequency component of the output from optical detector 30, so Fourier analyzer 38 provides a constant, linear output signal indicative on an "unperturbed" contortion-sensing fiber 10. The output from Fourier analyzer 38 is considered as the output sensing signal from OFDR system 20.

Figure 3:
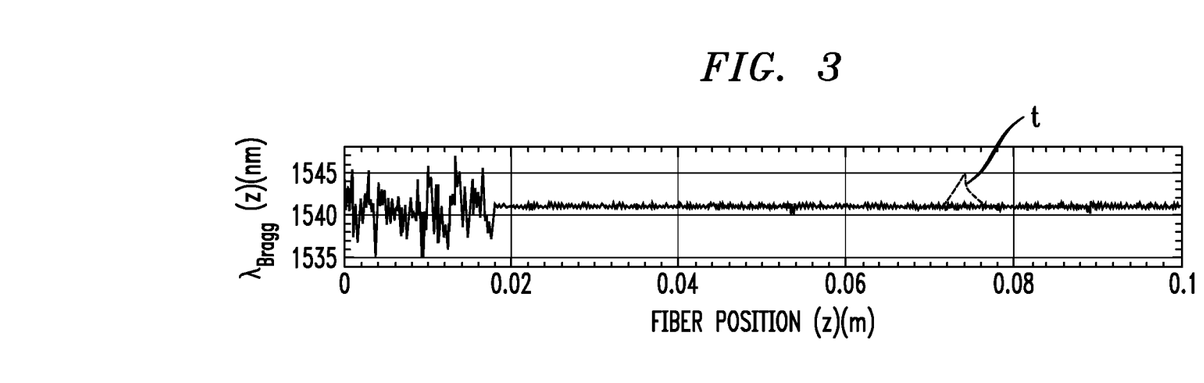
FIG. 3 is a plot of the output from the OFDR system as shown in FIG. 2, where in the absence of an applied force the output is constant, and the application of force is shown as spike in the output.

FIG. 3 illustrates this exemplary output from Fourier analyzer 38, in the form of the OFDR-derived, spatially resolved local Bragg wavelength along the length of fiber 10. As long as fiber 10 remains unperturbed, the Bragg wavelength of FBG 16 will be unchanged and the output sensing signal from OFDR system 20 is a constant value. In the plot of FIG. 3, the initial Bragg wavelength is shown by the constant response at $\lambda_{Bragg}$ of 1541 nm. Indeed, the plot as shown in FIG. 3 can be thought of as a "baseline" response from contortion-sensing optical fiber 10 (i.e., in the absence of an applied force), useful in the following discussion of the "contortion sensing" process.

That is, in the presence of an external force applied to contortion-sensing optical fiber 10, the portion of the fiber in proximity to the force will exhibit a stress-induced change in its refractive index (where the magnitude of the change in refractive index is known to be a function of the magnitude of the applied force. The portion of FBG 16 in this local area of contortion-sensing optical fiber 10 will therefore undergo a stress-induced change in its Bragg wavelength. This change in the Bragg wavelength of the reflected signal thus introduces a perturbation into the combination of the reflected beam with the reference beam (the beat frequency response). Referring to FIG. 3, the result of the application of an external force is shown as creating a localized spike in the space-domain measurement.

Mathematically, the local strain ε and resulting local Bragg wavelength shift $\Delta\lambda_{Bragg}$ in offset core 12 are related in the following manner.

$$\frac{\Delta\lambda_{Bragg}}{\lambda_{Bragg}} = \eta\varepsilon,$$

where η incorporates the strain-optic response of the optical fiber (for a conventional silica fiber, η≈0.78). Thus, in accordance with the principles of the present invention, OFDR system 20 provides high resolution (e.g., sub-mm) measurements of distortions imparted to contortion-sensing fiber 10, since the distortions will create a shift in the Bragg wavelength of included FBG 16.

Figure 4:
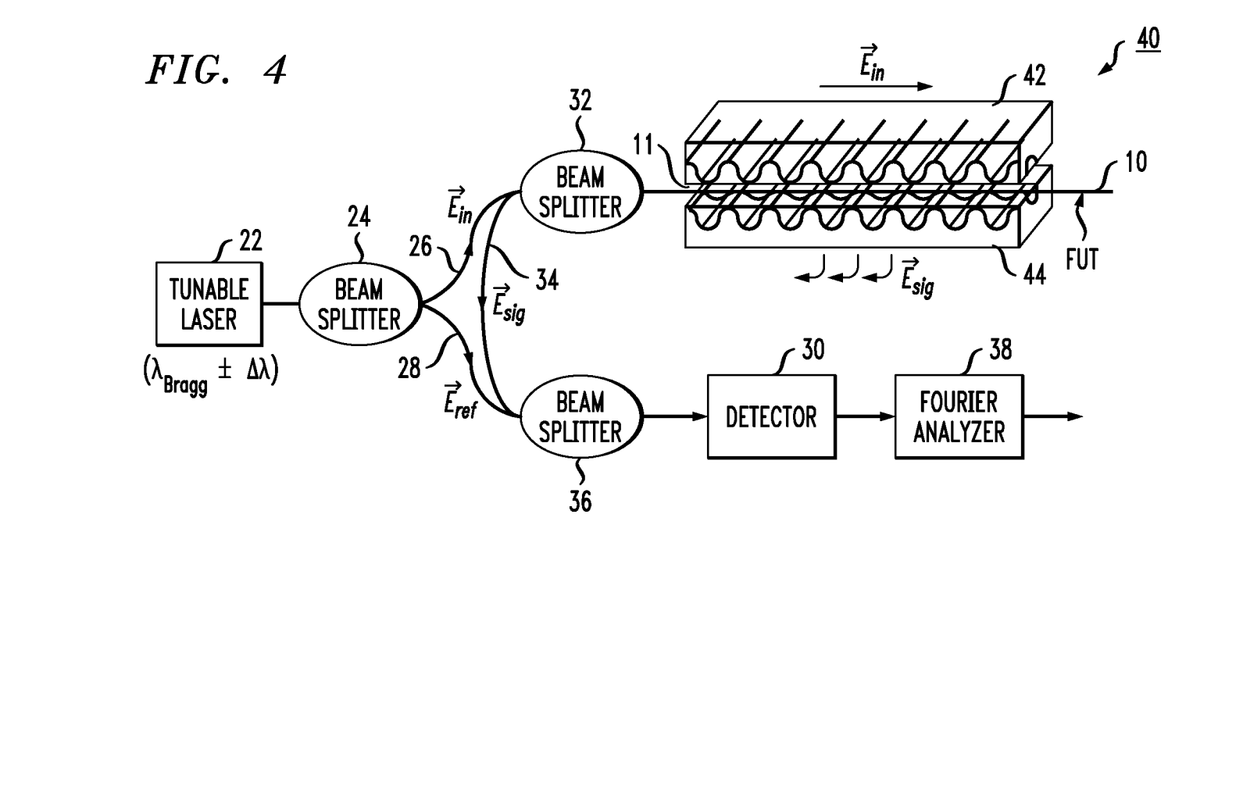
FIG. 4 depicts an alternative embodiment of the present invention, in this case using a reference "sensing" device in combination with the contortion-sensing optical fiber.

FIG. 4 illustrates another embodiment of the present invention, where in this case a reference device 40 with a known "textured" surface is used in combination with contortion-sensing optical fiber 10. In the particular arrangement of FIG. 4, fiber 10 is shown as passing through reference device 40. In general, reference device 40 may comprise any type of fiber support arrangement that includes a textured surface that can be defined in mathematical form (e.g., periodic or aperiodic corrugations). A reference device consisting of a single element may be used, with fiber 10 positioned along the textured surface of the element. In another embodiment, a reference device may use a pair of elements disposed on opposite sides of fiber 10, with one element having a textured surface and the other element having an essentially flat surface. In the particular configuration illustrated in FIG. 4, the reference device comprises a pair of elements with each element having a textured surface.

Figure 5:
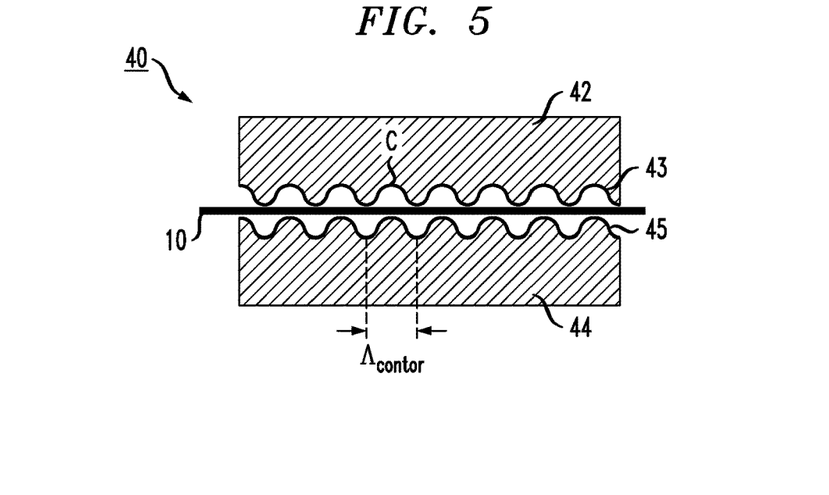
FIG. 5 is a cross-sectional view of the exemplary reference sensing device as shown in FIG. 4, illustrating the positioning of the contortion-sensing optical fiber between the pair of plates forming the reference device.

For the purposes of explanation, reference device 40 is shown as comprising a pair of parallel plates 42 and 44, with fiber 10 disposed between the plates. FIG. 5 is a cut-away side view of reference device 40, showing fiber 10 as positioned in a "no-load" case and spaced-apart relationship with plates 42 and 44. That is, with no external force applied to reference device 40, fiber 10 remaining unperturbed and does not engage with the corrugations formed in parallel plates 42, 44. As discussed above, as long as no external force is applied to contortion-sensing optical fiber 10, the Bragg wavelength of FBG 16 in offset core 12 of fiber 10 remains constant. In this case, therefore, the output from OFDR system 20 (i.e., from Fourier analyzer 38) will be the same as that shown in FIG. 3.

Figure 6:
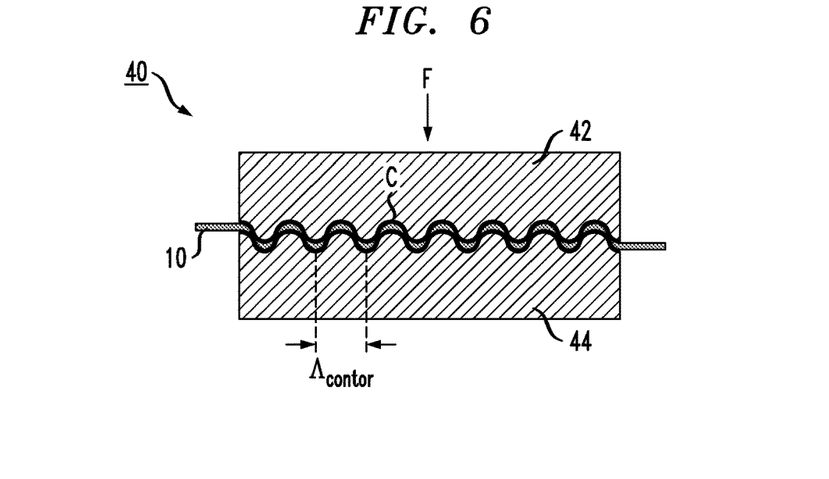
FIG. 6 is the same cross-sectional view as FIG. 5, in this case illustrating the application of an external force to the top plate of the reference device so as to press the optical fiber into the corrugations formed on opposing surfaces of the plates.
Figure 7:
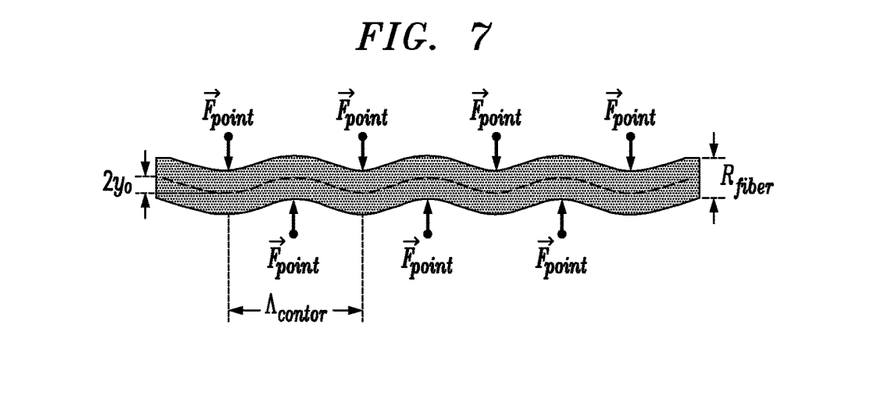
FIG. 7 illustrates the resultant shaping of the contortion-sensing optical fiber when influenced by the presence of an external force on the reference device.

FIG. 6 is a cut-away side view of the same components as shown in FIG. 5, in this case where an external force is applied to plate 42 of reference device 40 such that fiber 10 is "squeezed" between the plates. A depiction of contortion-sensing fiber 10 as shaped between plates 42, 44 during the application of an external force to reference device 40 is shown in FIG. 7

As shown in FIGS. 4-6, plates 42 and 44 are formed to contain reciprocal, sinusoidally-varying contortions C on their facing surfaces 43 and 45, respectively. The contortions C are defined as varying with a period $\Lambda_{contor}$. Fiber 10 is shown as positioned between facing surfaces 43, 45 of plates 42, 44, with far-end 13 of fiber 10 remaining free to move as different forces are applied to reference device 40. The application of an external force F to reference device 40 results in bringing plates 42 and 44 together, pushing fiber 10 into contortions C, as shown in FIGS. 6 and 7. In particular, the application of an external force results in bending fiber 10 in a periodic fashion to follow the paired contortions. As a consequence of this periodic bending, FBG 16 in offset core 12 undergoes a local strain that also shifts the Bragg wavelength of contortion-sensing fiber 10 in a periodic form. Thus, in contrast to the embodiment of FIG. 2 where the local strain only modified the Bragg wavelength of FBG 16 in this single location, the periodic nature of the applied strain (denoted as ε(z)) results in a period change in the Bragg wavelength of FBG 16. For embodiments where offset core 12 spirals around central axis 14, this local strain ε(z) within core 12 varies as $\cos(k_{spir}z)\cdot\cos(k_{co}z)$, where $k_{spir}=2\pi/\Lambda_{spir}$ and $k_{contor}=2\pi/\Lambda_{contor}$. This spatially-varying local bend results in a corresponding position-dependent Bragg wavelength shift, which can then be correlated to a specific value of the applied force by performing a Fourier analysis of the spectral beatings obtained from the resulting interference data obtained at detector 30. The spatial derivative of the phase component $\phi_{FBG}(z)$ of the grating-reflection coefficient may then be related to a local (shifted) Bragg wavelength $\lambda_{Bragg}(z)$ by using the following definition:

$$\frac{2\pi n}{\lambda_{Bragg}(z)} = \frac{d\phi_{FBG}(z)}{dz},$$

where n may be taken as the group index of the guided mode.

Figure 8:
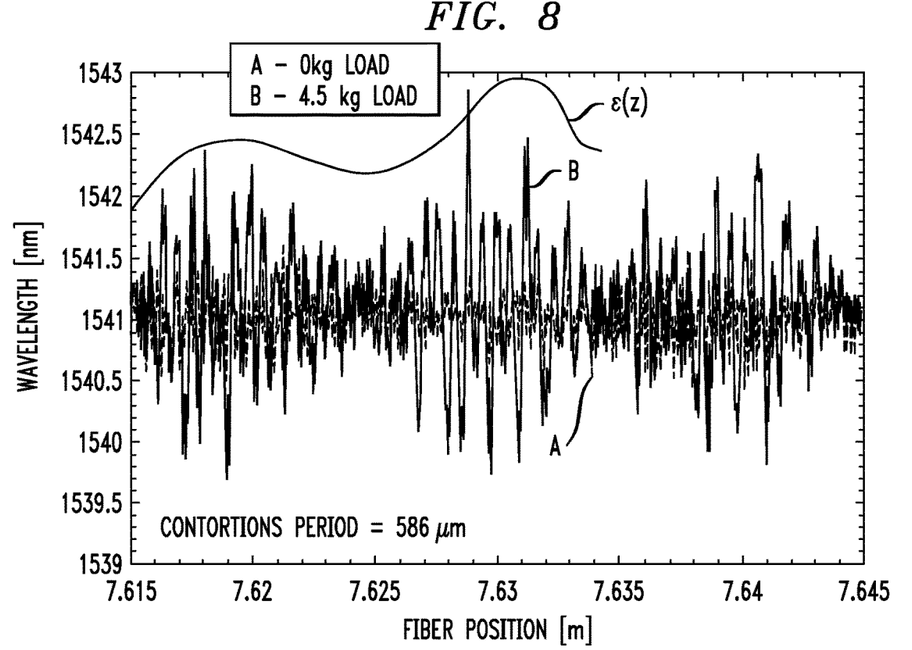
FIG. 8 is a graph of measured local Bragg wavelength along the length of the contortion-sensing optical fiber when disposed in a reference device having corrugations with a contortion period of 586 μm.

The graphs shown in FIGS. 8-11 are useful to review in order to understand the details of the inventive concept of utilizing a local shift in Bragg wavelength to measure sub-mm contortions (herein, micron-scale contortions) applied to a contortion-sensing optical fiber. FIG. 8 shows the position-dependent Bragg wavelength associated with an embodiment using reference device 40 with plates 42, 44 are formed to include contortions with a period $\Lambda_{contor}$ of 586 μm. In particular, the measurements are performed along a length L of reference device 40, creating the plots shown in FIG. 8 as the spectral beating/interference recorded by optical detector 30, showing $\Delta\lambda_{Bragg}$ as a function of length L. Plot A in FIG. 8 is associated with a "default" position of plates 42, 44; that is, without the application of an external force to reference device 40 (i.e., the configuration as shown in FIG. 5). In this case, contortion-sensing fiber 10 remains unperturbed (i.e., no external force present) and the noise-like trace of Plot A represents the actual Bragg wavelength associated with FBG 16 of fiber 10. Plot B in FIG. 8 illustrates the difference in response as recorded by optical detector 30 when a force (load) of 4.5 kg is applied to plate 42, so as to squeeze the two plates together. When this occurs, contortion-sensing fiber 10 is contorted in a manner that follows the period of the contortions formed within plates 42, 44. As a result of this contortion, the local Bragg wavelength of FBG 16 undergoes a modulation that follows the profile of the local strain ε(z) for the contortion period $\Lambda_{contor}$, where in this example $\Lambda_{contor}$=586 μm.

Figure 9:
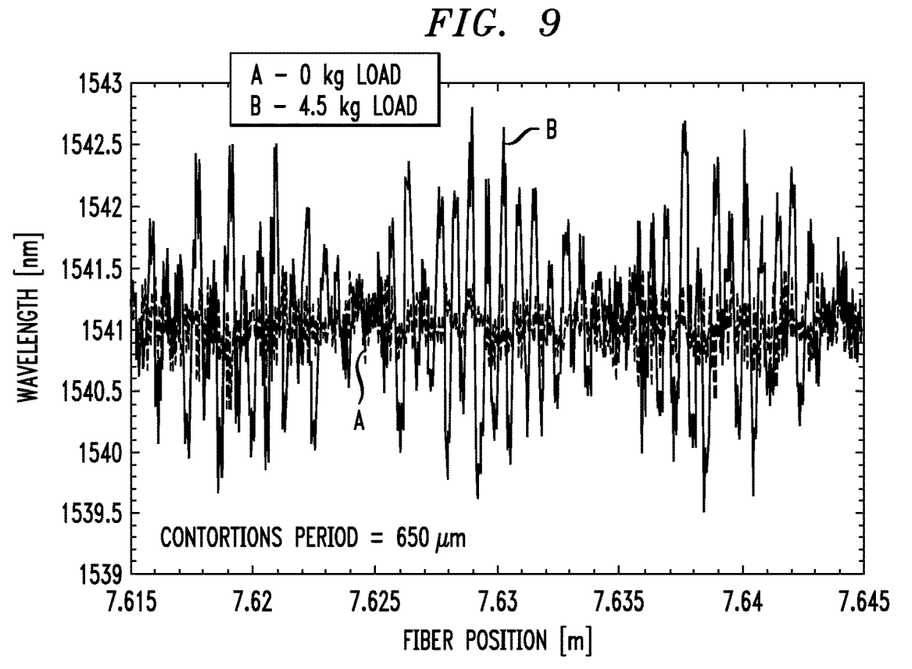
FIG. 9 is a graph of measured Bragg wavelength along the length of the contortion-sensing optical fiber when disposed in a reference device having corrugations with a contortion period of 650 μm.

FIG. 9 shows the same two plots A and B (i.e., "no applied force" and "squeezed" with a force of 4.5 kg), but in this case for a reference device 40 having contortions with a period $\Lambda_{contor}$ of 650 μm. The slightly faster modulation of the Bragg wavelength (when comparing plot B of FIG. 10 to plot B of FIG. 8) confirms the presumption that the modulation of the Bragg wavelength tracks the periodic contortions formed in plates 42, 44.

Figure 10:
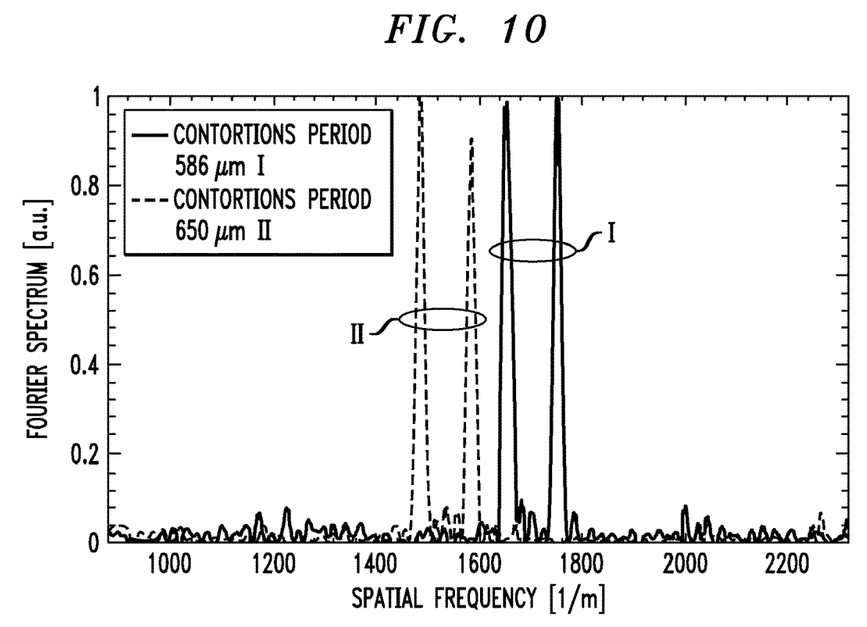
FIG. 10 plots the Fourier spectrum as a function of spatial frequency associated with the sensing devices of FIGS. 8 and 9.

FIG. 10 illustrates the Fourier transform of the plot B waveforms from FIGS. 8 and 9, provided as an output from Fourier analyzer 38 of OFDR 20. As discussed above, Fourier analyzer 38 transforms the position-dependent output from detector 30 into a frequency-based representation, with FIG. 10 illustrating the frequency spectra for both contortion periods. In particular, plots I are associated with plot B of FIG. 8 (i.e., $\Lambda_{contor}$ of 586 µm) and plots II are associated with plot B of FIG. 9 (i.e., $\Lambda_{contor}$ of 650 µm). It is clearly shown for both cases that the Bragg wavelength for reference device 40 is modulated at two specific frequencies that correspond to $k_{contor} \pm k_{spir}$. The average of these two frequency components should thus correspond to the spatial period of only the contortions, with the effects of the spiral configuration cancelling each other out. The average of plots I results in a spatial period of 587 µm, and the average of plots II results in a spatial period of 651 µm, both values well within an acceptable margin of error. Indeed, it is possible that the slight difference between the actual values and calculated values may result, in part, from errors in the assumed value for group index n.

Figure 11:
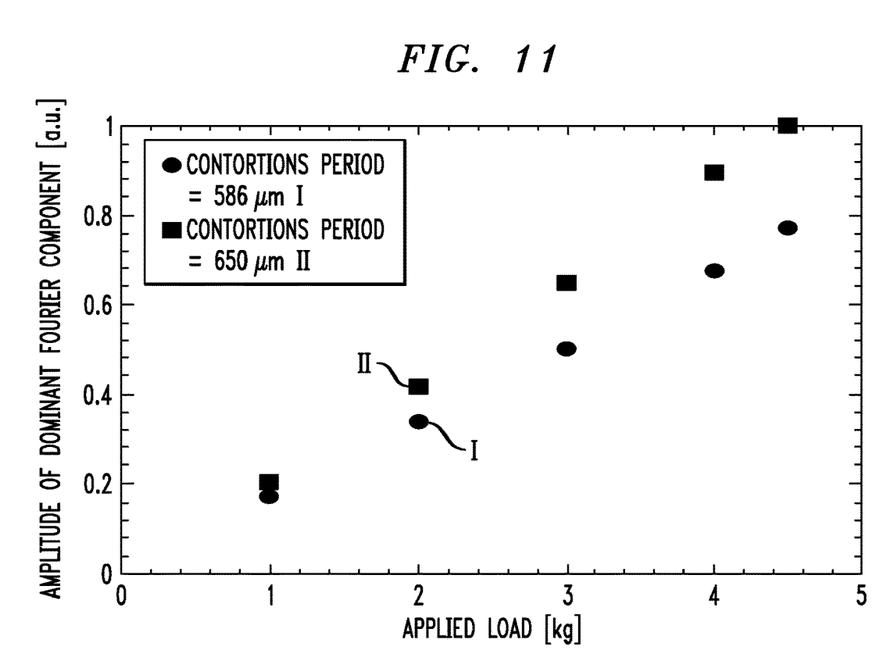
FIG. 11 is a graph illustrating the change in amplitude of the dominant Fourier amplitude of the spectrum of FIG. 10 as a function of a change in force applied to the sensing devices of FIGS. 8 and 9.

FIG. 11 contains a set of measurements for both contortion periods as the force applied to plate 42 is changed (i.e., as the applied load is changed). The specific data points represent the averaged value of the two dominant Fourier components, as described above with reference to FIG. 10. Referring to FIG. 11, it is shown that the applied load was varied over a range from 1 kg to 4.5 kg. The slope of each curve is approximately linear, and does not appear to decrease even at the maximum amount of applied load. This result confirms the presumption that the applied weights (at least to the 4.5 kg value) do not contribute to the generation of un-intended frequencies during the application of the load. Moreover, the slope is larger for the case of longer-period contortions (here, 650 µm vs. 586 µm), which also follows the presumption that contortion-sensing fiber 10 is deformed more easily for the case of longer period contortions.

Figure 12:
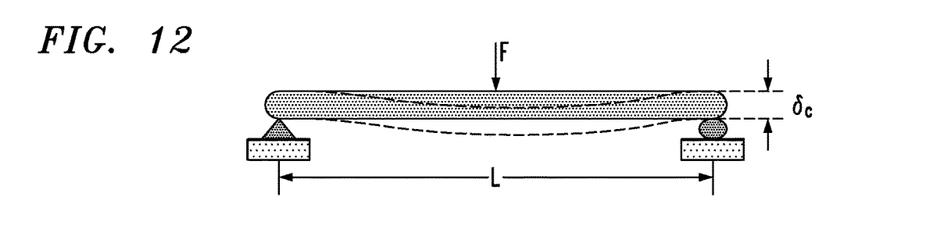
FIG. 12 is a simple 3-point force diagram useful in deriving the relationship between applied force and shift in Bragg wavelength of the sensor fiber of the present invention.

Thus, from a review of FIGS. 10 and 11, it is clear that in accordance with the principles of the present invention, the Bragg shift experienced by reference device 40 is related not only to the contortions experienced by contortion-sensing optical fiber 10, but also the magnitude of the applied force that subjects the fiber to these contortions. In determining the relationship between the applied force and the change in Bragg wavelength, an analysis may begin with a simple three-point beam bending model, as shown in FIG. 12. The deflection $\delta_c$, may be defined as follows:

$$\delta_c = \frac{FL^3}{48EI},$$

where F is the applied force (as shown in FIG. 12), L is the length of the fiber, E is the Young's modulus of the material forming the fiber and I is the moment of inertia of the cross section, defined as:

$$I = \frac{\pi}{4} R_{fiber}^4,$$

$R_{fiber}$ being the radius of the fiber. In extending this simple model to an exemplary embodiment where the core is disposed in a spiral configuration that is offset from a central axis, it is assumed that the scaling is the same, but the required force is larger by a factor $1/\eta_b$. Thus, the change in amplitude of a reflected signal created by a contorted FBG 16 within offset core 12 of contorted fiber 10 (as forced between plates 42, 44 as shown, for example, in FIG. 6) arises from a force F at periodically-spaced points through:

$$2y_0 = \frac{\eta_b F \Lambda^3}{48 E \frac{\pi}{4} R_{fiber}^4},$$

where $\Lambda_{cor} = L$.

With this understanding, the point force F may be related to the Bragg wavelength shift as follows:

$$\left. \frac{\Delta \lambda_{Bragg}(z)}{\lambda_{Bragg}} \right|_{max} = \frac{\pi \eta \gamma \eta_n F \Lambda_{cor}}{6 E R_{fiber}^4}.$$

The point force F may be replaced by the total force $F_{total}$ using the total number of periods in the sensing device $N_{sd}$ and the length of the sensing device $L_{sd}$ where $F_{total} = N_{sdr} F$ and $L_{sd} = N_{sdr} \Lambda_{cor}$. Substituting these values, the relationship between total force and Bragg wavelength shift may be expressed as:

$$\left. \frac{\Delta \lambda_{Bragg}(z)}{\lambda_{Bragg}} \right|_{max} = \frac{\pi \eta \gamma \eta_n F_{total} \Lambda_{cor}^2}{6 E L_{gr} R_{fiber}^3}.$$

Thus, the shift in Bragg wavelength is shown to be linear in terms of force per unit area, quadratic in terms of contortion period of the sensing device, and inversely proportional to the cube of the fiber radius. For example, presuming that contortion-sensing optical fiber 10 has its core(s) 12 offset by 35 µm, and FBG 16 is created to have a Bragg wavelength of 1541 nm, and reference device 40 is configured to have contortions with a period $\Lambda_{contor}$ of 700 µm, a recorded Bragg wavelength shift of about 1 nm can be equated to a physical displace $y_0$ of about 0.3 µm.

Figure 13:
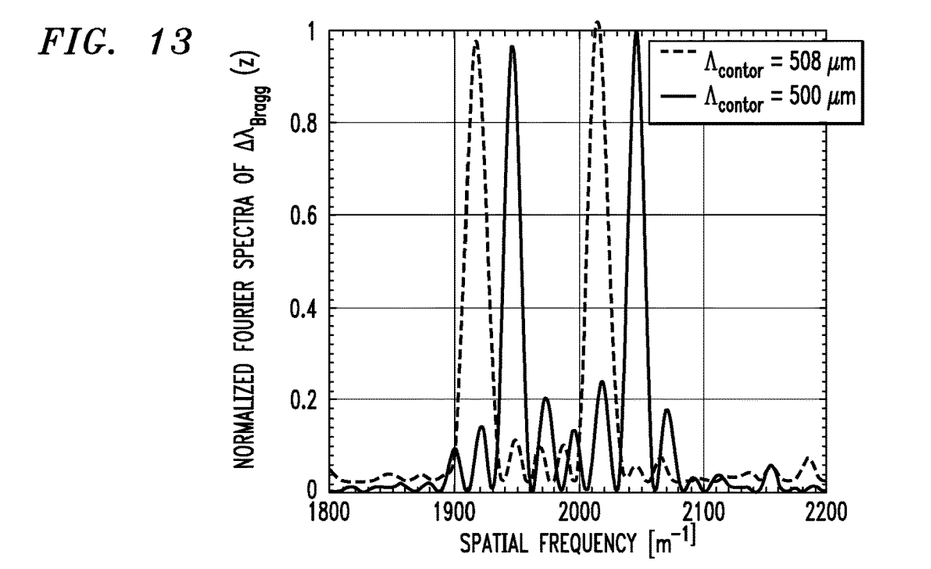
FIG. 13 contains plots illustrating the difference in Fourier spectra for embodiments of the present invention utilizing reference devices with only slight differences in contortion period.

The resultant sensitivity of the fiber-based contortion sensor of the present invention has been analyzed by comparing measurements associated with reference devices having only micron-scale differences. In particular, a first configuration using plates 42, 44 with contours having first period $\Lambda_1$ of 500 µm was studied, providing Fourier responses for both "no load" and a load of 5 kg on reference device 40. A second configuration was formed of plates with a contour period $\Lambda_2$ of 508 µm was subject to the same pair of "no load" and 5 kg load conditions. The Fourier spectra output from analyzer 38 for both configurations is shown in FIG. 13. It is clear that the inventive sensor is able to distinguish between the applied contortions of spatial frequencies that are submillimeter and that differ by less than 2%.

Figure 14:
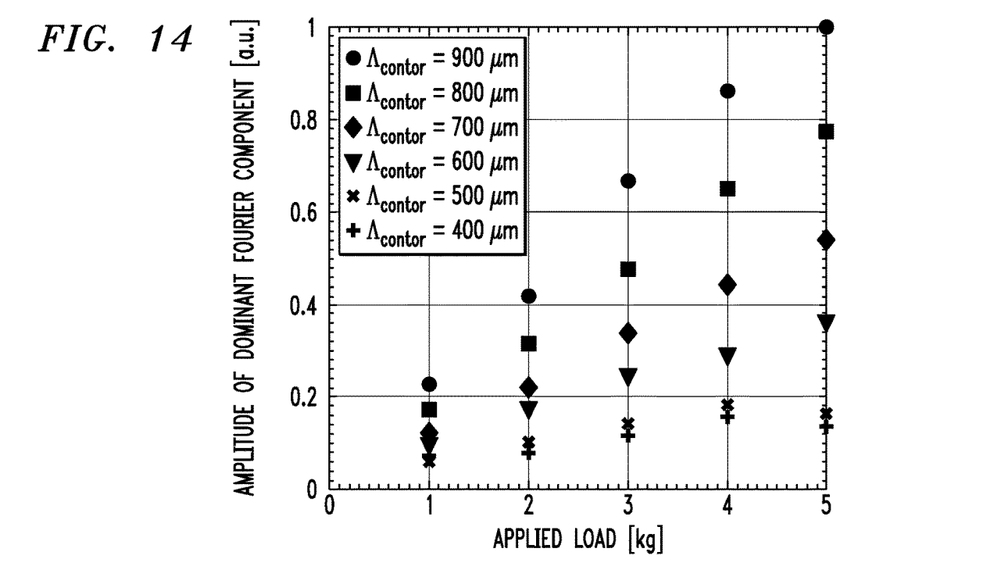
FIG. 14 contains a set of plots, associated with reference devices of several different corrugation periods, all showing the linear relationship between a change in external force and a shift in the Bragg wavelength.

The ability to measure even very slight changes in external forces applied to reference device 40 has been studied as well. FIG. 14 contains a set of plots showing the change in Bragg wavelength shift as a function of applied force for various configurations of reference device 40 ("various configurations" meaning a set of different periods for the contortions formed in plates 42, 44). The Fourier amplitude shows a linear dependence on the applied force for most of the force and contortion periods.

Figure 15:
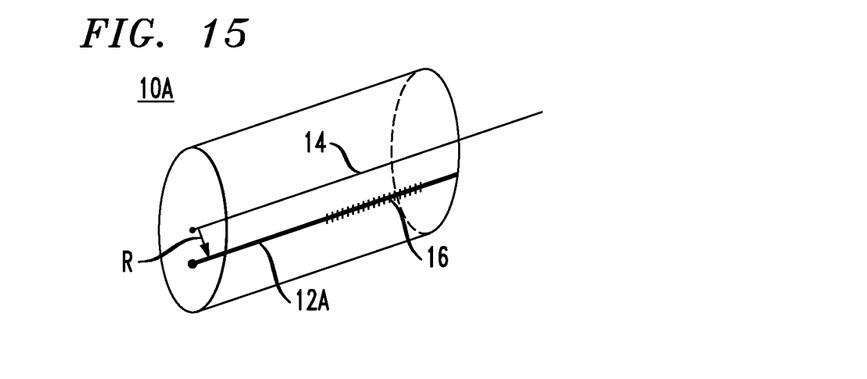
FIG. 15 illustrates an alternative configuration of a sensor fiber, in this case including a single offset core disposed parallel to the central axis of the fiber.
Figure 16:
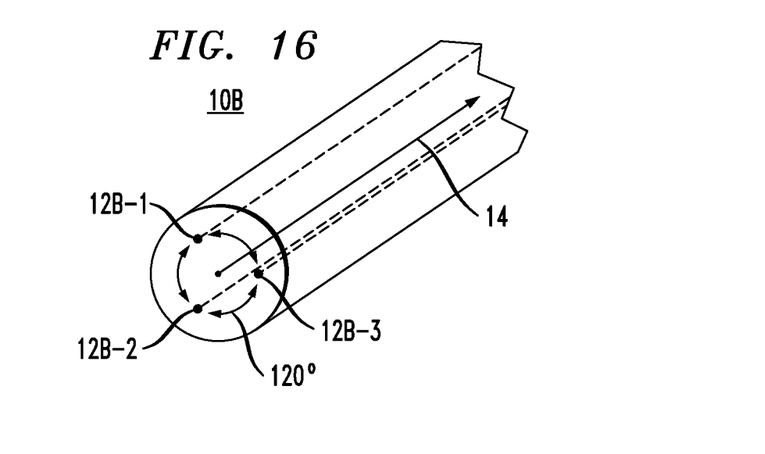
FIG. 16 illustrates yet another configuration of a sensor fiber, in this case including multiple offset cores, each disposed parallel to and separated from the central axis of the fiber.
Figure 17:
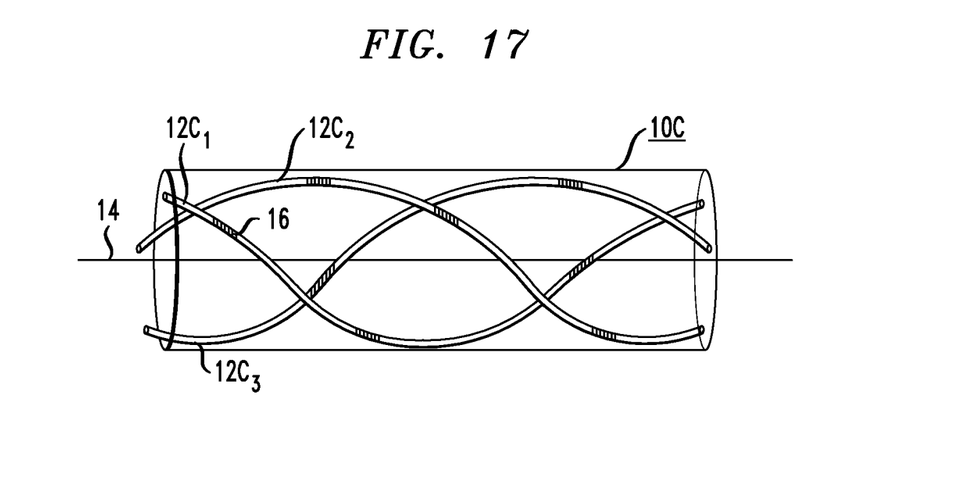
FIG. 17 illustrates a specific sensor fiber formed to include a set of three offset cores, spaced 120° apart around the central axis and configured in a spiral arrangement, with each offset core exhibiting the same spiral period.

While this discussion to this point presupposes the use of a contortion-sensing fiber with a single offset core (that is also spirally-disposed), other embodiments of the present invention may utilize other configurations of one or more offset cores. For example, it is possible to utilize an offset core 12A that is disposed parallel to central axis 14. FIG. 15 is an isometric view of an exemplary sensor fiber 10A illustrating a single "linear" offset core 12A. As long as offset core 12A is not positioned along a plane perpendicular to the plane of the applied force, the measurements generated by reflections from FBG 16 within offset core 12A will provide an accurate result. In another embodiment, a sensor fiber may comprise a multi-core configuration. In one case, as shown in FIG. 16, a plurality of cores 12B may comprise a set of "linear" cores disposed equidistant from each other (and from central axis 14 of sensor fiber 10B). Another configuration of this embodiment, as shown in FIG. 17, may utilize a set of offset cores 12C that are all disposed to spiral around central axis 14. In this particular configuration utilizing a set of three offset cores, any local contortion (or applied force) results in an equal amount (but opposite in sign) of strain in the offset cores, with an azimuthal angle θ=120° between the offset cores. All are disposed to exhibit the same spiral periodicity, $\Lambda_{spir}$, and all are formed to exhibit the same grating structure.

The optical fiber itself may be a traditional glass-based fiber, or may formed of a polymer or other elastic material (or a combination of materials), where the use of non-glass-based fibers has been found to exhibit a greater sensitivity to changes in applied force. For example, selected polymer materials can exhibit a Young's modulus that is over fifty times smaller than that of glass. As a result, a force sensor based on the use of a polymer fiber may enhance the sensitivity and resolution by the same degree (i.e., fifty times the sensitivity and resolution of a standard glass fiber sensor).

The sensor of the present invention, as described above, provides a spatial resolution of less than 1 mm, and is able to detect sub-micron fiber displacements from a neutral axis (i.e., the "central axis" as defined above). A force sensitivity of less than 25 gm per contortion, with a force resolution of less than 5 gm per contortion has been achieved. Moreover, it is contemplated that by reducing the overall diameter of the fiber by a factor of 10, an improvement in the detection resolution by at least two orders of magnitude is possible.

Additionally, while the above-described embodiments are directed to the use of an FBG to measure contortions, other types of back scattering (for example, Rayleigh scattering) may be used in the OFDR configuration in a similar manner. In the case of Rayleigh scattering, the native elastic backscattering may be used instead of the elastic scattering created by the presence of the grating I the FBG-based fiber.

It will be apparent to those skilled in the art that various modifications and variations can be made to the present invention without departing from the spirit or scope thereof. Thus, it is intended that the present invention cover the modifications and variations of the above-described embodiments, all of which are considered to fall within the spirit and scope of the invention as the defined by the claims appended hereto.

What is claimed is:

1. A monitoring system comprising
a contortion-sensing optical fiber having at least one offset core region including a continuous fiber Bragg grating (FBG) inscribed therealong, the continuous FBG formed to exhibit a defined Bragg wavelength $\lambda_{Bragg}$; and
an optical frequency domain reflectometry (OFDR) system coupled to the contortion-sensing optical fiber, the OFDR system including an optical detector responsive to a reflected beam from the contortion-sensing optical fiber to create an optical output signal.

2. The monitoring system as defined in claim 1, further comprising:
a Fourier analyzer coupled to the optical detector and utilized to perform a Fourier transform on the optical detector output signal to generate a measurement of a local Bragg wavelength, wherein a defined shift in wavelength between the defined Bragg wavelength and the local Bragg wavelength corresponds to the application of a force to the contortion-sensing optical fiber.

3. The monitoring system as defined in claim 1 wherein the optical fiber comprises a single offset core displaced at a radius R from a central axis of the optical fiber.

4. The monitoring system as defined in claim 3 wherein R is within the range of approximately 10%-90% of the outer radius of the optical fiber.

5. The monitoring system as defined in claim 3 wherein the offset core is disposed in a spiral form around the central axis, the spiral being periodic with a defined period $\Lambda_{spiral}$.

6. The monitoring system as defined in claim 1 wherein the optical fiber comprises a plurality of offset cores, each having a same displacement R from a central axis and positioned to exhibit a like separation between adjacent offset cores.

7. The monitoring system as defined in claim 6 wherein the plurality of offset cores are disposed in a spiral configuration around the central axis, each offset core exhibiting substantially the same spiral periodicity $\Lambda_{spiral}$.

8. The monitoring system as defined in claim 1 wherein the optical fiber is formed of a glass material.

9. The monitoring system as defined in claim 1 wherein the optical fiber is formed of a polymer material with an elasticity less than the elasticity of glass so as to detect smaller scale force changes than glass fibers.

10. The monitoring system as defined in claim 1, further comprising:
a reference device disposed adjacent to a length of the contortion-sensing optical fiber, the reference device including a corrugated surface of a defined pattern for creating a contortion in the fiber that can be converted into the applied force.

11. The monitoring system as defined in claim 10 wherein the reference device comprises a rigid plate with a corrugated surface.

12. The monitoring system as defined in claim 10 wherein the reference device comprises
a rigid plate with a corrugated surface; and
a flat plate disposed parallel to, and spaced-apart from, the rigid plate, wherein the contortion-sensing optical fiber is disposed between the rigid plate and the flat plate, with the rigid plate oriented such that the corrugated surface is adjacent to the contortion-sensing optical fiber, a longitudinal axis of the contortion-sensing optical fiber aligned in parallel with the rigid plate and the flat plate.

13. The monitoring system as defined in claim 10 wherein the reference device comprises a pair of plates, each plate having a corrugated surface, wherein the contortion-sensing optical fiber is disposed between the pair of plates with the corrugated surfaces disposed adjacent to the optical fiber.

14. The monitoring system as defined in claim 10 wherein the corrugated surface comprises an aperiodic pattern of corrugations across the extent of the surface.

15. The monitoring system as defined in claim 10 wherein the corrugated surface comprises a periodic pattern of corrugations across the extent of the surface.

16. The monitoring system as defined in claim 15 wherein the periodic pattern of corrugations comprises sinusoidally-varying corrugations of a defined period $\Lambda_{contor}$.

17. The monitoring system as defined in claim 10 wherein the contortion-sensing fiber is formed to including a continuous FBG and variation in FBG is created by the reference device.

18. The monitoring system as defined in claim 17 wherein the reference device comprises a pair of plates, each plate having a corrugated surface in the form of periodic corrugations of the same defined period $\Lambda_{contor}$, wherein the plates are disposed relative to one another such that the corrugations align, the contortion-sensing optical fiber disposed between the aligned sets of corrugations such that the application of an external force to the reference device creates local strain within the FBG of the optical fiber related to the period of the corrugations.

19. The monitoring system as defined in claim 17 using a Fourier transform of modulations in the FBG wavelength as created by the reference device to determine the presence of contortions.

20. The monitoring system as defined in claim 10 disposed as a component in a catheter or surgical instrument.

\* \* \* \* \*